United States Patent
Asakai

(10) Patent No.: US 8,171,243 B2
(45) Date of Patent: May 1, 2012

(54) DATA CONTROL APPARATUS, DATA CONTROL METHOD, AND DATA CONTROL PROGRAM

(75) Inventor: Hiroshi Asakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 939 days.

(21) Appl. No.: 12/222,234

(22) Filed: Aug. 5, 2008

(65) Prior Publication Data

US 2008/0313412 A1    Dec. 18, 2008

Related U.S. Application Data

(63) Continuation of application No. PCT/JP2006/303588, filed on Feb. 27, 2006.

(51) Int. Cl.
*G06F 12/00* (2006.01)
*G06F 13/00* (2006.01)

(52) U.S. Cl. ......... 711/159; 711/100; 711/154; 711/200

(58) Field of Classification Search .................. 711/100, 711/154, 159, 200
See application file for complete search history.

(56) References Cited

U.S. PATENT DOCUMENTS

| | | | |
|---|---|---|---|
| 5,170,473 A | 12/1992 | Ishida | |
| 5,625,846 A * | 4/1997 | Kobayakawa et al. | 710/52 |
| 6,393,545 B1 * | 5/2002 | Long et al. | 712/34 |
| 6,421,760 B1 * | 7/2002 | McDonald et al. | 711/114 |
| 7,240,160 B1 * | 7/2007 | Hetherington et al. | 711/122 |
| 2004/0103230 A1 | 5/2004 | Emerson et al. | |

FOREIGN PATENT DOCUMENTS

| | | |
|---|---|---|
| EP | 0 695 988 A2 | 2/1996 |
| EP | 1 422 626 | 5/2004 |
| JP | 2-140860 | 5/1990 |
| JP | 2-230345 | 9/1990 |
| JP | 04-038543 | 2/1992 |
| JP | 05-233440 | 9/1993 |
| JP | 8-63954 | 3/1996 |
| JP | 2002-183073 | 6/2002 |

OTHER PUBLICATIONS

Extended European Search Report for corresponding European Application 06714725.6-1229; dated Oct. 1, 2009.
Notice of Rejection for corresponding Japanese Application 2008-501570; issued Apr. 1, 2009.
International Search Report mailed Oct. 10, 2006 in connection with the International application No. PCT/JP2006/303588.

\* cited by examiner

*Primary Examiner* — Tuan V. Thai
(74) *Attorney, Agent, or Firm* — Staas & Halsey LLP

(57) ABSTRACT

A data control apparatus is connected to a central processing unit that processes data and to a main storage unit that stores therein the data, and controls output of the data. The data control apparatus includes a data storage unit that stores therein data output from the central processing unit to the main storage unit and data output from the central processing unit to other central processing unit, an information addition unit that adds information indicating an output enabled state to the data when the data stored in the data storage unit is in the output enabled state, and a data output unit that outputs the data with the information added thereto by the information addition unit from oldest stored data in order of storage in the data storage unit.

3 Claims, 11 Drawing Sheets

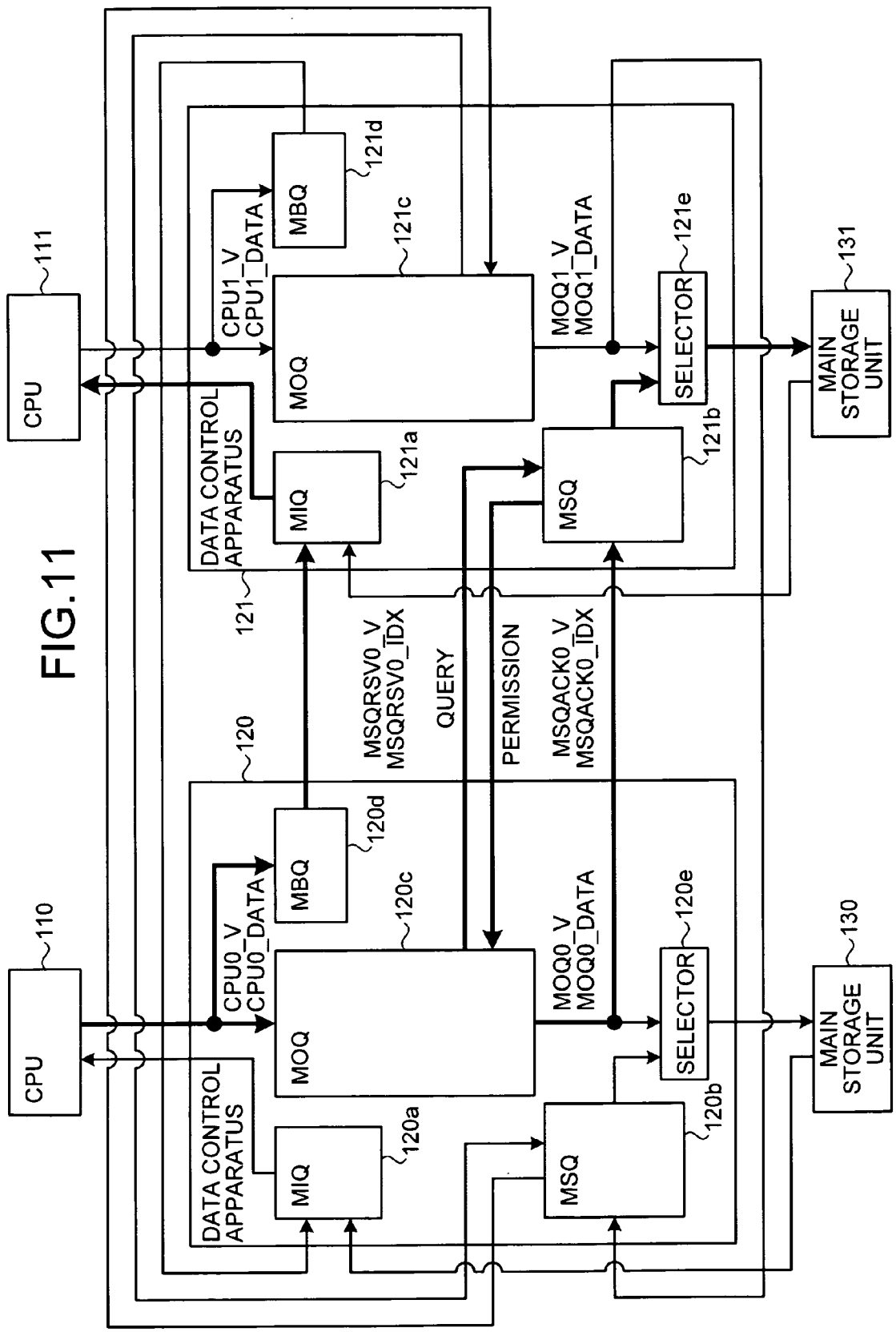

DATA CONTROL APPARATUS, DATA CONTROL METHOD, AND DATA CONTROL PROGRAM

CROSS REFERENCE TO RELATED APPLICATIONS

This is a continuing application, filed under 35 U.S.C. §111(a), of International Application PCT/JP2006/303588, filed Feb. 27, 2006, the contents of which are incorporated herein by reference.

BACKGROUND OF THE INVENTION

1. Field of the Invention

The present invention relates to a data control apparatus connected to a central processing unit that processes data and to a main storage unit that stores therein the data, to control output of the data, and a data control method and a data control program.

2. Description of the Related Art

Conventionally, when certain data is output to a cache memory of a central processing unit (CPU) in a computer system, because the system has data to be immediately output after the CPU accepts a data output request and also has data to be output after the CPU queries an output destination and obtains permission, it is necessary to prepare data queues (storage units) that temporarily store therein these data respectively (for example, Japanese Patent Application Laid-Open No. H08-063954).

Specific explanation is made with reference to FIG. 11. A computer system shown in FIG. 11 includes a CPU 110 and a CPU 111, a data control apparatus 120 and a data control apparatus 121, and a main storage unit 130 and a main storage unit 131. These are formed into clusters, respectively, and thus data transfer between the clusters is performed by using the data control apparatus 120 or the data control apparatus 121. Besides, the data control apparatus 120 is formed of a plurality of data queues (MIQ 120a, MSQ 120b, MOQ 120c, and MBQ 120d) that temporarily stores therein data, and of a selector 120e that performs arbitration of data output from the MOQ 120c or the MSQ 120b to the main storage. Similarly to the data control apparatus 120, the data control apparatus 121 is also formed of MIQ 121a, MSQ 121b, MOQ 121c, MBQ 121d, and a selector 121e.

When the CPU 110 or the CPU 111 outputs data in a cache memory of its own to any other device, to keep sequence of the data, the data queue (e.g., MIQ 120a) needs to output data for the same destination to the output destination in the order in which the data is output from the CPU, and thus the data queue controls received data using FIFO (First In First Out).

Based on the configuration, when the data in the cache memory of the CPU 110 is output to the CPU 111, the CPU 111 already establishes an acceptable state of the data because the request is sent from the CPU 111, and therefore, the CPU 110 immediately outputs the data to the data queue.

Specifically, when the data in the cache memory of the CPU 110 is output to the CPU 111, the CPU 110 outputs the requested data to the MBQ 120d of the data control apparatus 120. The MBQ 120d that receives the data checks that a communication channel is unoccupied, and then outputs the data to the CPU 111 which is the output destination.

Meanwhile, when the data in the cache memory of the CPU 110 is output to the main storage unit 131, the CPU 110 outputs the data to the data queue. However, the data queue that receives the data cannot determine whether the output destination is in the acceptable state, and thus the data queue that receives the data makes a query whether the main storage unit 131 as the output destination is in the acceptable state, and outputs the received and stored data after permission is granted.

Specifically, when the data in the cache memory of the CPU 110 is output to the main storage unit 131, the CPU 110 outputs the data to the MOQ 120c of the data control apparatus 120. The MOQ 120c queries the MSQ 121b of the data control apparatus 121 about whether the main storage unit 131 is in the acceptable state, and outputs the received data to the MSQ 121b after permission is obtained. Thereafter, the MSQ 121b outputs the received and stored data to the selector 121e of the data control apparatus 121, and the selector 121e arbitrates the received data and outputs the data to the main storage unit 131.

The conventional technology, however, requires a plurality of memories (MOQ or MBQ) with a processing speed equal to that of the CPU to improve system performance, and thus there is a problem that cost for construction of the system increases. Specifically, the memory (MOQ) for data output from the CPU to the main storage unit and the memory (MBQ) for data output to another CPU are required, and preparation of the both memories with the processing speed equal to that of the CPU causes an increase in cost.

SUMMARY

It is an object of the present invention to at least partially solve the problems in the conventional technology.

A data control apparatus according to one aspect of the present invention is connected to a central processing unit that processes data and to a main storage unit that stores therein the data, and controls output of the data, and includes a data storage unit that stores therein data output from the central processing unit to the main storage unit and data output from the central processing unit to other central processing unit, an information addition unit that adds information indicating an output enabled state to the data when the data stored in the data storage unit is in the output enabled state, and a data output unit that outputs the data with the information added thereto by the information addition unit from oldest stored data in order of storage in the data storage unit.

A data control method according to another aspect of the present invention is a data control method of controlling output of data between a central processing unit that processes data and a main storage unit that stores therein the data, and includes storing data output from the central processing unit to the main storage unit and data output from the central processing unit to other central processing unit, adding information indicating an output enabled state to the data when the data stored in the storing is in the output enabled state, and outputting the data with the information added thereto in the adding from oldest stored data in order of storage in the storing.

A computer-readable recording medium according to still another aspect of the present invention stores therein a computer program for controlling output of data between a central processing unit that processes data and a main storage unit that stores therein the data, the computer program causing a computer to execute storing data output from the central processing unit to the main storage unit and data output from the central processing unit to other central processing unit, adding information indicating an output enabled state to the data when the data stored in the storing is in the output enabled state, and outputting the data with the information added thereto in the adding from oldest stored data in order of storage in the storing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a diagram for explaining a conventional technology.

DETAILED DESCRIPTION OF THE PREFERRED EMBODIMENTS

Embodiments of a data control apparatus according to the present invention are explained in detail below with reference to the accompanying drawings.

Hereinafter, in a first embodiment, an overview and characteristics of the data control apparatus according to the present invention, a configuration of the data control apparatus, explanation of the principle of the data control apparatus, explanation of time charts, and an effect of the first embodiment or the like are explained in order below.

[Overview and Characteristics of Data Control Apparatus]

Figure 1:
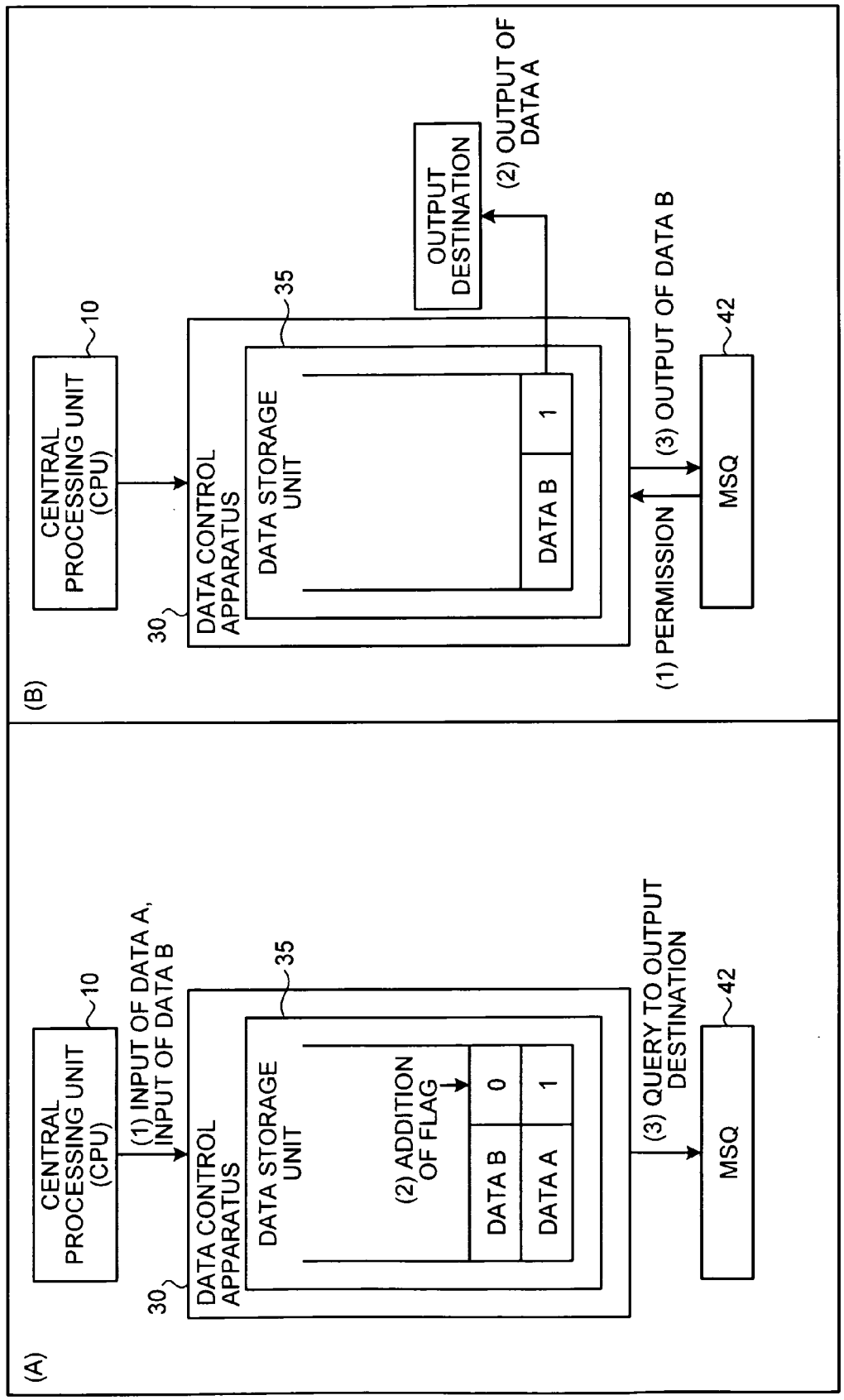
FIG. 1 is a system configuration diagram showing an overall configuration of a data control apparatus according to a first embodiment.

First, the overview and the characteristics of the data control apparatus according to the first embodiment are explained with reference to FIGS. 1 and 2. FIG. 1 is a system configuration diagram showing an overall configuration of the data control apparatus according to the first embodiment. As shown in the figure, the data control apparatus 30 according to the first embodiment is arranged between a central processing unit (CPU) 10 and a main storage unit 50, and includes a data storage unit 35. Note that (A) and (B) of FIG. 1 represent state transitions of the data control apparatus from storage of data to output of the data.

Based on the configuration, the data control apparatus 30 is schematically configured to temporarily store therein data output from the central processing unit (CPU) 10 and to output the data to an output destination such as the main storage unit 50 and a central processing unit for other device. Therefore, the data control apparatus 30 is mainly characterized in that the cost of the system construction can be reduced.

The main characteristics are specifically explained below. When "data A" which is data to be output to other central processing unit and "data B" which is data to be output to a main storage unit 60 are input from the central processing unit 10, the data storage unit 35 of the data control apparatus 30 stores therein both the "data A" and the "data B" in the order in which the data is input ((1) of (A) in FIG. 1).

When the data stored in the data storage unit 35 is in the output enabled state, the data control apparatus 30 adds information indicating the output enabled state (hereinafter, FLAG) to the data. Specifically, because the data output from the central processing unit 10 to other central processing unit can be immediately output, the data control apparatus 30 adds FLAG=1 to the "data A".

Meanwhile, it is necessary to query an output destination about the data output from the central processing unit 10 to the main storage unit 60, and thus the data control apparatus 30 adds FLAG=0 to the "data B" and queries MSQ 42 which is an output destination of the "data B" about whether the data can be accepted thereby. When receiving output permission from the MSQ 42 being the output destination, the data control apparatus 30 adds FLAG=1 to the "data B" stored in the data storage unit 35 ((2) of (A) in FIG. 1 through (1) of (B) in FIG. 1).

The data control apparatus 30 then outputs the data with FLAG=1 added thereto to the data storage unit 35 in from the oldest stored data in order of storage. Specifically, since the "data A" can be output immediately, the FLAG=1 is added to "data A" upon storage thereof in the data storage unit 35, and the "data A" is immediately output to the other central processing unit which is the output destination because the "data A" is the oldest data with FLAG=1 among the data stored in the data storage unit 35 ((2) of (B) in FIG. 1).

Meanwhile, since the "data B" cannot immediately be output when it is stored in the data storage unit 35, the data control apparatus 30 queries the MSQ 42 being the output destination about whether the data can be output thereto. When an acknowledgment of permission is received, FLAG=1 is added to the "data B", and thereafter, since the data is the oldest data with FLAG=1 among the data stored in the data storage unit 35, the "data B" is output to the MSQ 42 as the output destination ((3) of (B) in FIG. 1).

As explained above, the data control apparatus 30 according to the first embodiment stores the data output from the central processing unit (CPU) in one data storage unit (memory), and can output the data to each output destination in the order in which the data is stored when the stored data is in the output enabled state. As a result, the data control can be performed by one memory without any need to provide a plurality of high-cost storage units (memories) having the speed equal to that of the central processing unit to improve the system performance, which allows cost reduction of the system construction.

[Overall Configuration of System Including Data Control Apparatus]

Next, the overall configuration of the system including the data control apparatus 30 shown in FIG. 1 will be explained with reference to FIG. 2. FIG. 2 is a block diagram showing the overall configuration of the system including the data control apparatus 30. As shown in this figure, the system includes the central processing unit 10 and a central processing unit 20, the data control apparatus 30 and a data control apparatus 40, and the main storage unit 50 and the main storage unit 60. These are formed into clusters respectively, and the units in each cluster have the same functions as each other. Thus, the central processing unit 10, the data control apparatus 30, and the main storage unit 50 will be explained herein.

The central processing unit 10 is a processor that includes an internal memory for storing therein control programs such as OS (Operating System), programs to define various procedures, and required data, and that executes various processes using these programs. Specifically, the central processing unit 10 outputs a data transmission request to other central processing unit, and executes the programs stored in the main storage unit 50 and the main storage unit 60.

The data control apparatus 30 is a unit that controls data output, and includes MIQ 31, MSQ 32, MOMBQ 33, and a selector 34, which are particularly closely related to the present invention. Because MIQ 41, MSQ 42, MOMBQ 43, and a selector 44 of the data control apparatus 40 have the same functions as those of the MIQ 31, the MSQ 32, the MOMBQ 33, and the selector 34 which are explained below, and thus detailed explanation thereof is omitted.

The MIQ 31 is a unit that temporarily stores therein data input from the main storage unit and from the MOMBQ of other cluster. Specifically, the MIQ 31 temporarily stores therein data input from the main storage unit 50 and the MOMBQ 43. For example, the central processing unit 10 checks that there is room in the MIQ 31, and then sends a data request to other CPU and the main storage unit 50.

The MSQ 32 is a unit that temporarily stores therein data output from other cluster to the main storage. A specific example thereof is such that the MSQ 32 temporarily stores therein the data output from the central processing unit 20 via the data control apparatus 40 to the main storage unit 50.

The MOMBQ 33 is a unit that temporarily stores therein data output from the central processing unit to the main storage unit and also data output from the central processing unit to other central processing unit, adds information indicating an output enabled state to the data when the stored data is in the output enabled state, and outputs the data with the information added thereto from the oldest stored data in order of storage. The MOMBQ 33 includes a data storage unit 33a, an information addition unit 33b, and a data output unit 33c, which are particularly closely related to the present invention. It is noted that the data storage unit 33a corresponds to "data storage unit" described in claim, the information addition unit 33b corresponds to "information addition unit" described therein, and the data output unit 33c corresponds to "data output unit" described therein.

The data storage unit 33a is a unit that stores therein both the data output from the central processing unit to the main storage unit and the data output from the central processing unit to other central processing unit. A specific example thereof is such that the data storage unit 33a stores therein both the data output from the central processing unit 10 to the main storage unit 50 and to the main storage unit 60 and the data output from the central processing unit 10 to other central processing unit in the order in which the data is output.

The information addition unit 33b is a unit that adds information indicating the output enabled state to data when the data stored in the data storage unit 33a is in the output enabled state. A specific example thereof is such that the information addition unit 33b adds the information (e.g., FLAG=1) indicating the output enabled state to the data output from the central processing unit 10 to other central processing unit upon storage of the data in the data storage unit 33a. As for the data output from the central processing unit 10 to the main storage unit 50 or to the main storage unit 60, the information addition unit 33b queries the main storage unit 50 or the main storage unit 60 which is the output destination about whether either one of the storage units can accept the data, and adds the information (e.g., FLAG=1) indicating the output enabled state to the data after permission is granted.

The data output unit 33c is a unit that outputs the data added with the information by the information addition unit 33b from the oldest in order. A specific example thereof is such that the data output unit 33c outputs the data added with the information indicating the output enabled state (e.g., FLAG=1) to the output destination in order from the oldest among the data transmitted from the central processing unit 10 to the main storage unit 50 and to the main storage unit 60 and the data transmitted from the central processing unit 10 to other central processing unit.

The selector 34 is a unit that arbitrates the storage of those data output from the MOMBQ or from the MSQ in the main storage. A specific example thereof is such that the selector 34 arbitrates the storage of those data output from the MOMBQ 33 or from the MSQ 32 in the main storage unit 50.

The main storage unit 50 is a storage unit (memory unit) that stores therein data and programs required for various processes performed by the central processing unit 10. A specific example thereof is such that the main storage unit 50 stores therein the programs executed by the central processing unit 10 or by the central processing unit 20 and also the data output from the cache memory by the central processing unit 10 or by the central processing unit 20.

[Explanation of Principle of Data Control Apparatus]

Figure 3:
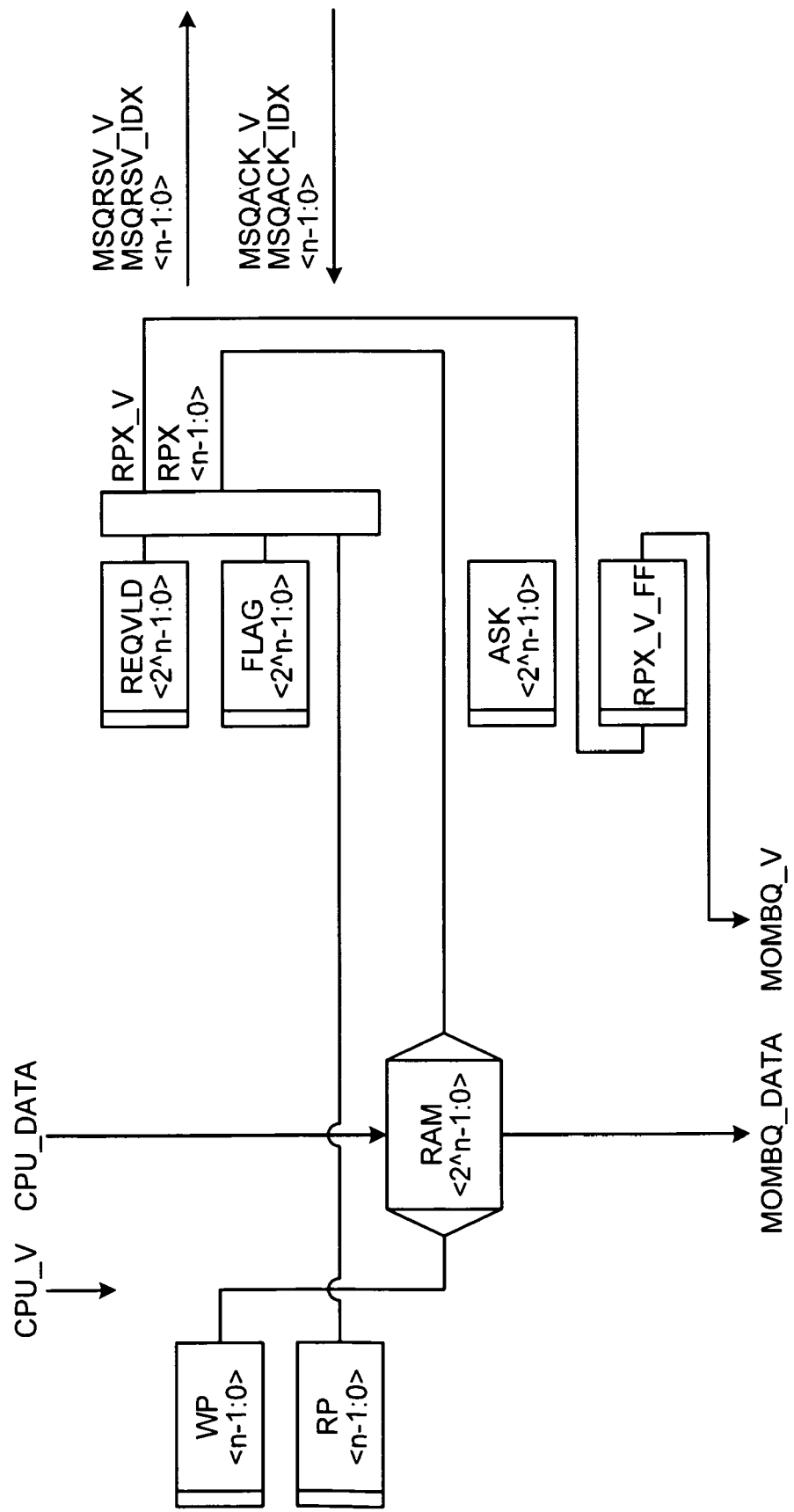
FIG. 3 is a principle explanatory diagram of the data control apparatus according to the first embodiment.
Figure 4:
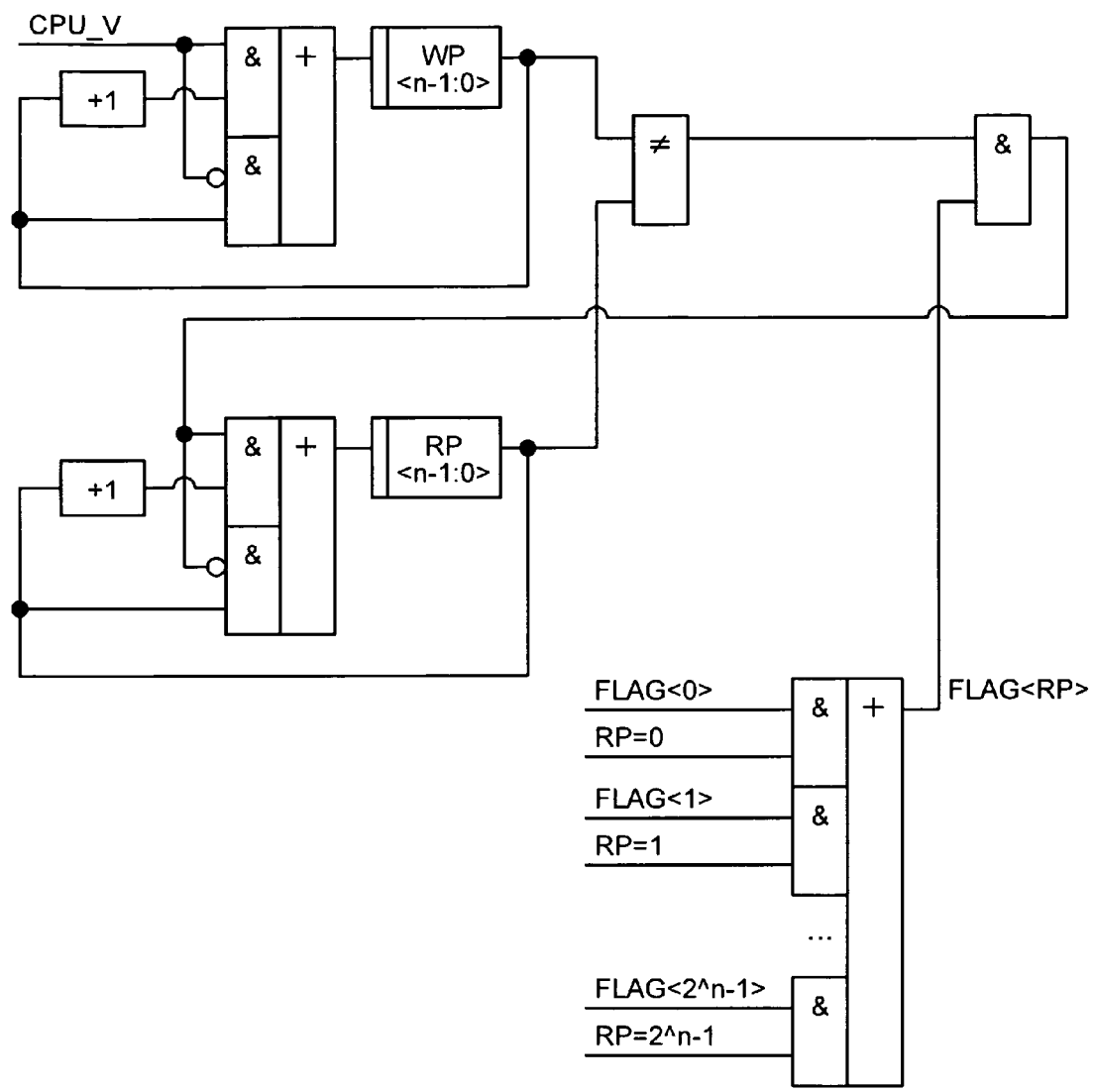
FIG. 4 is a diagram for further explaining the principle of the data control apparatus according to the first embodiment.
Figure 5:
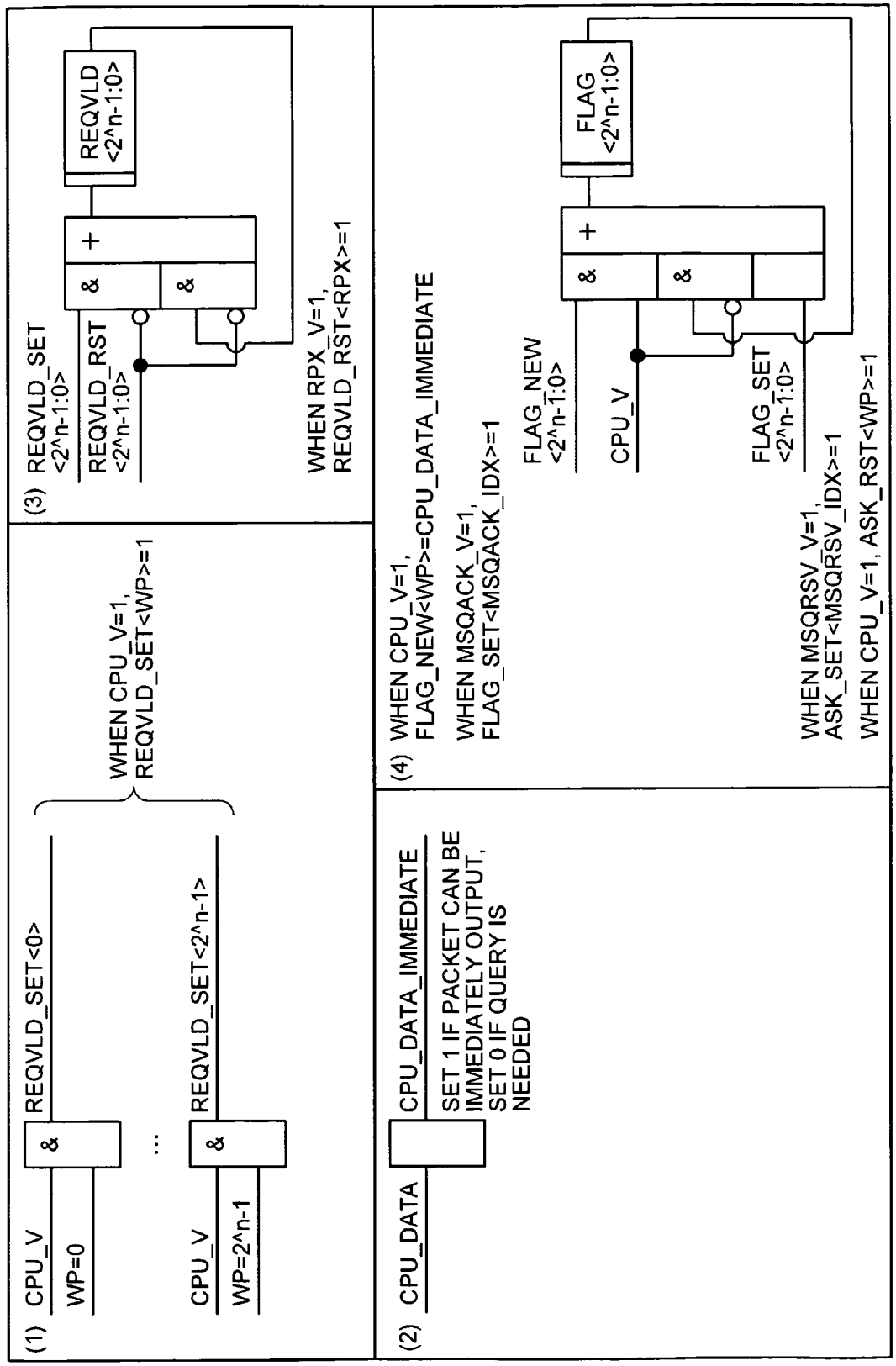
FIG. 5 is a diagram for further explaining the principle of the data control apparatus according to the first embodiment.
Figure 6:
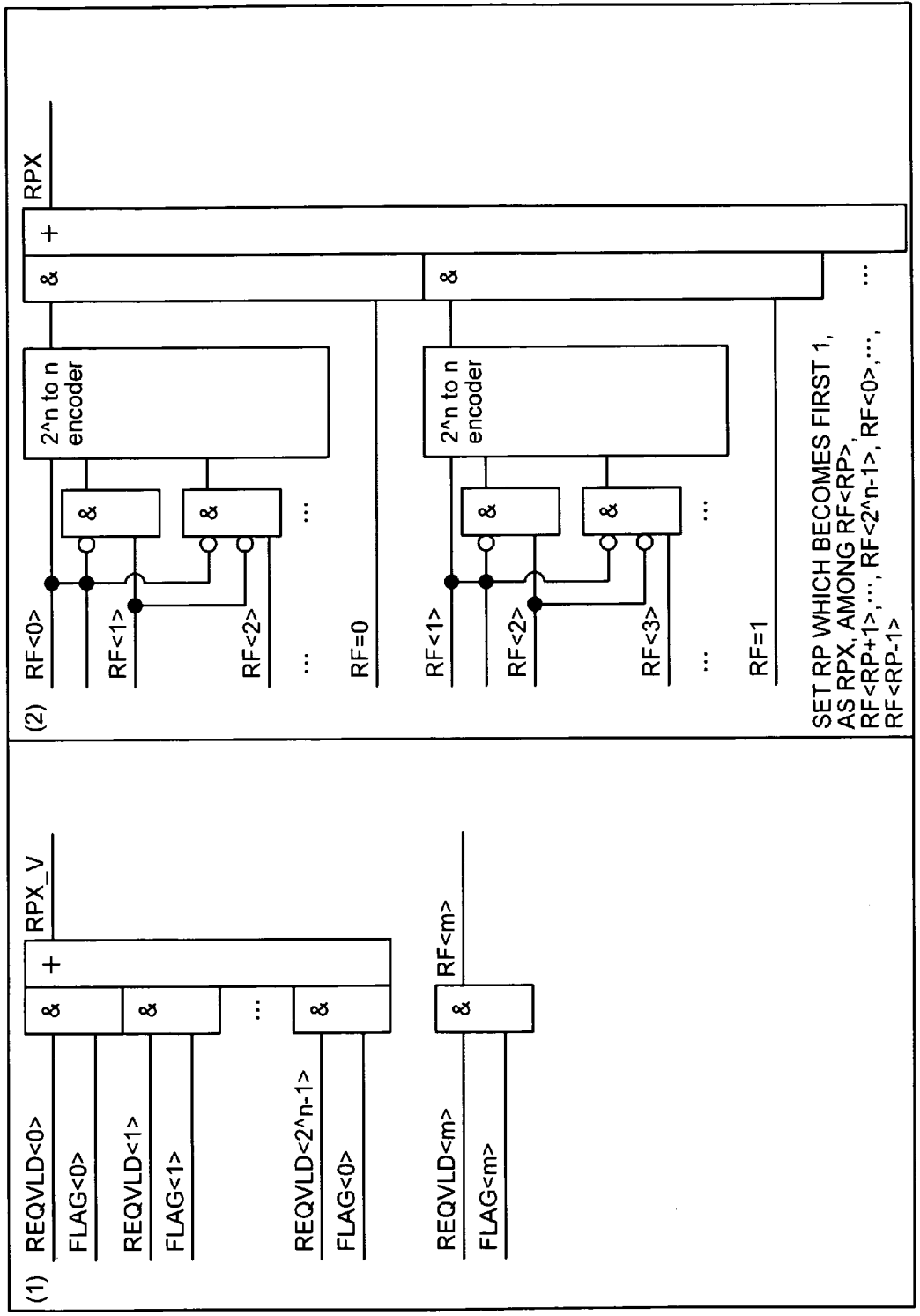
FIG. 6 is a diagram for further explaining the principle of the data control apparatus according to the first embodiment.
Figure 7:
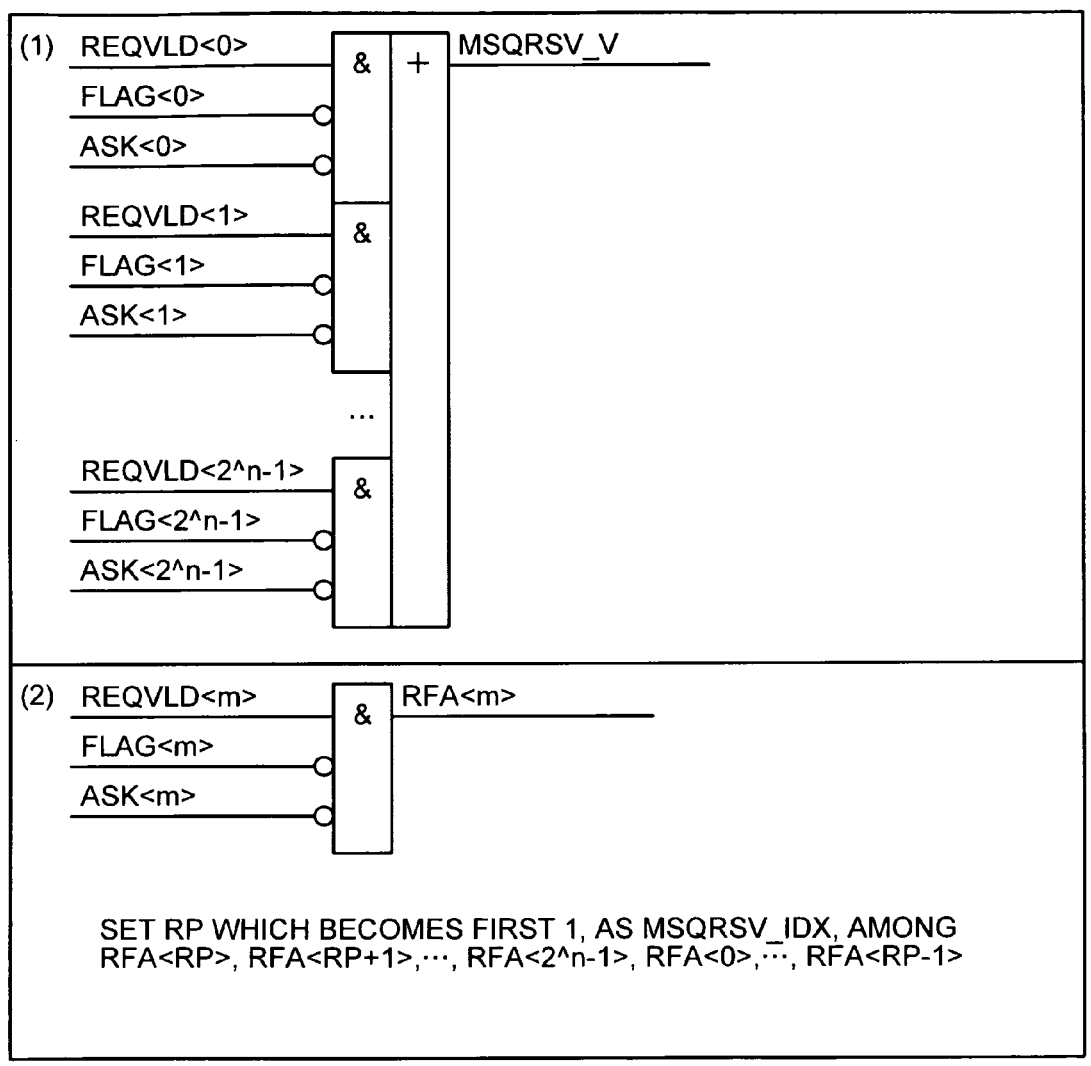
FIG. 7 is a list of details of the data control apparatus according to the first embodiment.

Next, the principle of the data control apparatus 30 will be explained with reference to FIGS. 3 to 7. FIG. 3 is a principle explanatory diagram of the data control apparatus 30 (MOMBQ) according to the first embodiment, FIG. 4 is a diagram for further explaining the principle of the data control apparatus 30 (WP and RP) according to the first embodiment, FIG. 5 is a diagram for further explaining the principle of the data control apparatus 30 (REQVLD, FLAG, and ASK) according to the first embodiment, FIG. 6 is a diagram for further explaining the principle of the data control apparatus 30 (RPX_V and RPX) according to the first embodiment, and FIG. 7 is a diagram for further explaining the principle of the data control apparatus 30 (MSQRSV_V and MSQRSV_IDX) according to the first embodiment. It is noted that because the principle of the data control apparatus 30 and the principle of the data control apparatus 40 are the same as each other, the principle of the data control apparatus 30 will be explained below.

First, as shown in FIG. 3, when data is output from the CPU, the data is transmitted as CPU_DATA based on CPU_V=1. If CPU_V=1, then the CPU_DATA is written into RAM<WP>, if it can be immediately output, then FLAG<WP>=1 is set, and if a query is needed, then FLAG<WP>=0 is set.

Subsequently, if there are data for which the query is not yet made and FLAG=0 is set, the data control apparatus 30 searches for the oldest data among them, and queries an output destination about it together with MSQRSV_IDX indicating an address of RAM based on MSQRSV_V=1.

Then, when MSQACK_IDX based on MSQACK_V=1 is received as permission of the query, the data control apparatus 30 sets FLAG<MSQACK>=1, which specifically indicates that the oldest CPU_DATA with FLAG=1 is set as MOMBQ_DATA and is output from MOMBQ.

Next, WP (Write Pointer) and RP (Read Pointer) will be explained with reference to FIG. 4. As shown in this figure, the WP is an n-bit register, and if CPU_V=1, the value is incremented by 1, otherwise the value is stored therein. Specifically, the WP is used for a write address of RAM.

The RP is an n-bit register, and if a value of the RP is not equal to a value of the WP and FLAG<RP>=1, the value is incremented by 1, otherwise the value is stored therein. Specifically, the RP is an address of the oldest CPU_DATA stored in the RAM.

Next, REQVLD, FLAG, and ASK will be explained with reference to FIG. 5. The REQVLD of them is a register of 2 to the n-th power bits. If CPU_V=1, then REQVLD<WP>=1 is set, while if RPX_V=1, then REQVLD<RPX>=0 is set.

Further, FLAG is a register of 2 to the n-th power bits, and if CPU_V=1 and CPU_DATA can immediately be output, the FLAG is set to 1, while if a query is needed, it is set to 0, so that if MSQACK_V=1, FLAG<MSQACK_IDX>=1 is set. Specifically, the FLAG indicates that the CPU_DATA stored in the RAM can be output.

ASK is a register of 2 to the n-th power bits, and if MSQRSV_V=1, then ASK<MSQRSV_IDX>=1 is set, while if CPU_V=1, then ASK<WP>=0 is set, which specifically indicates that the query is already made for the CPU_DATA stored in the RAM.

Next, RPX_V and RPX will be explained with reference to FIG. 6. The RPX_V of them is a 1-bit signal which is set to 1 when there is CPU_DATA with REQVLD=1 and FLAG=1 in the RAM, which specifically indicates that there is data to be output from the MOMBQ.

Further, the RPX is an n-bit signal and indicates m which first obtains REQVLD=1 and FLAG=1 for m=RP, RP+1, . . . , 2 to the n-th power −1, 0, . . . , RP−1, which specifically indicates an address of the oldest CPU_DATA among the CPU_DATA in the RAM which can be output.

Next, MSQRSV_V and MSQRSV_IDX will be explained with reference to FIG. 7. The MSQRSV_V of them is a 1-bit signal which is set to 1 when there is CPU_DATA with REQVLD=1 and FLAG=0 and ASK=0 in the RAM, which specifically indicates that the query is made for MSQRSV.

Further, the MSQRSV_IDX is an n-bit signal, and indicates m which first obtains REQVLD=1 and FLAG=0 and ASK=0 for m=RP, RP+1, . . . , 2 to the n-th power −1, 0, . . . , RP−1. Specifically, the MSQRSV_IDX indicates that the query is made for CPU_DATA of which address in the RAM.

[Time Chart (When Query is Needed)]

Figure 8:
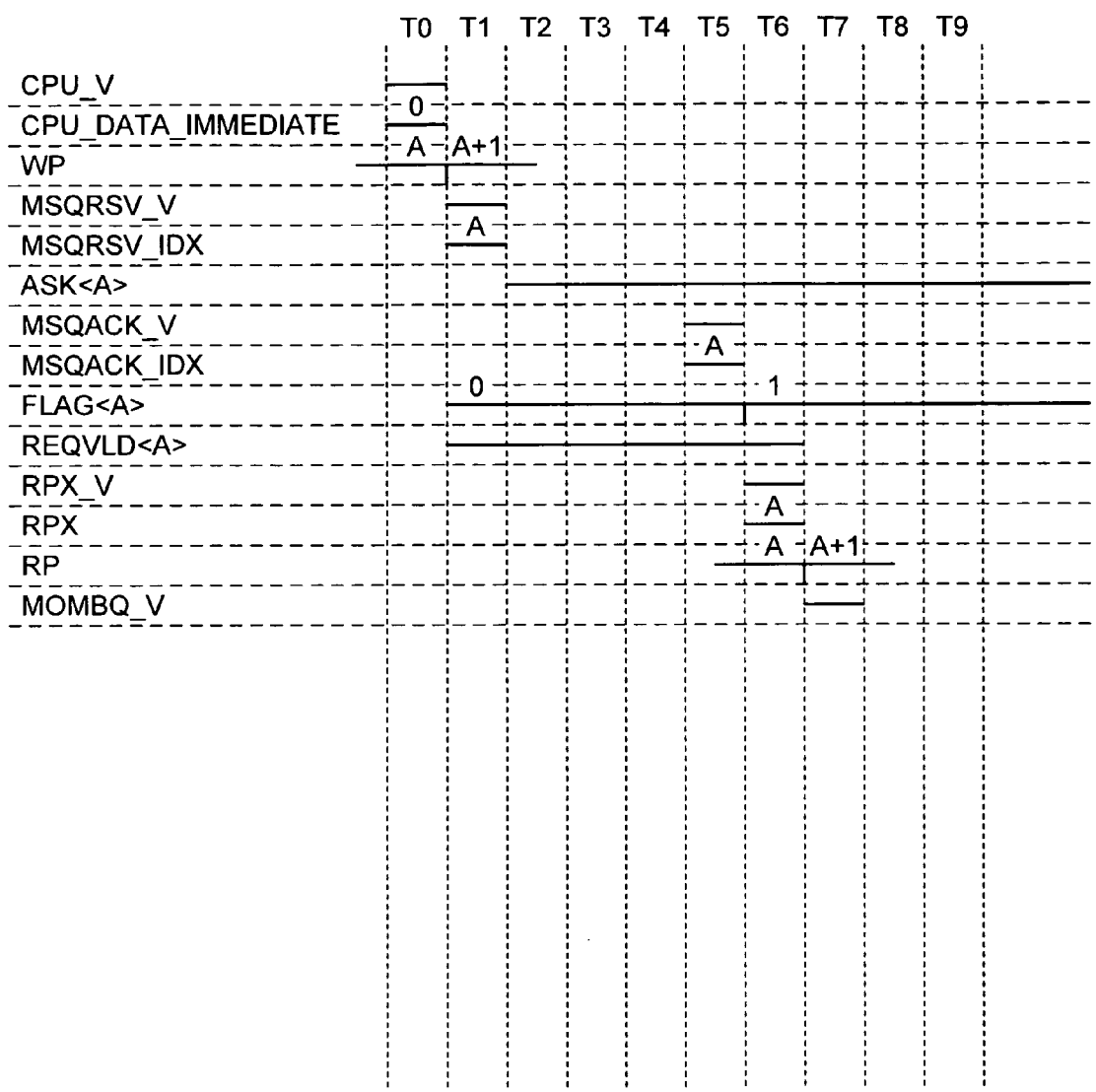
FIG. 8 is a time chart of the data control apparatus according to the first embodiment (when query is needed)
Figure 9:
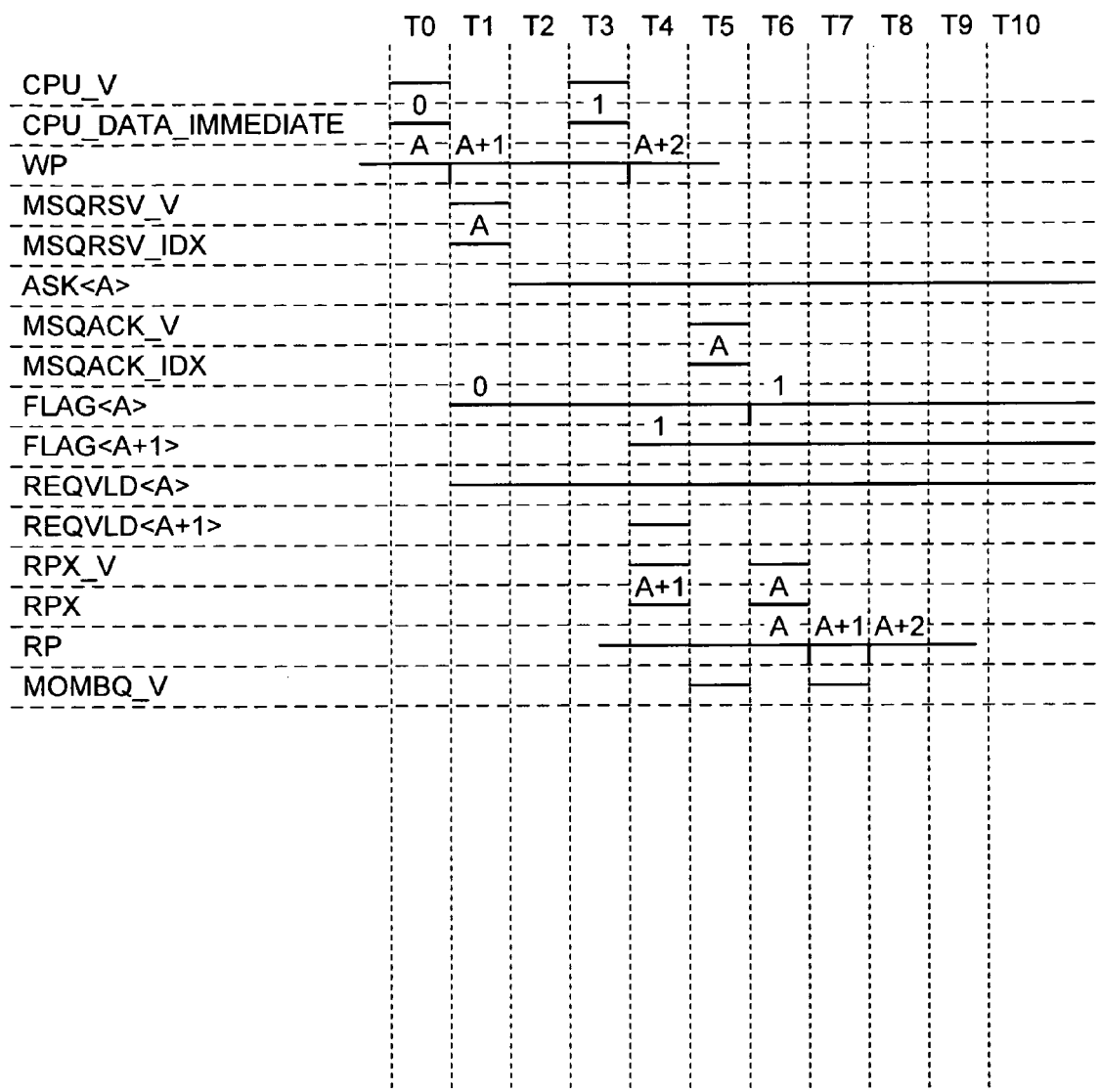
FIG. 9 is a time chart of the data control apparatus according to the first embodiment (when query is needed and when query is not needed)

Next, time charts of the data control apparatus 30 according to the first embodiment will be explained with reference to FIGS. 8 and 9. FIG. 8 is a time chart of the data control apparatus 30 according to the first embodiment (when query is needed), and FIG. 9 is a time chart of the data control apparatus 30 according to the first embodiment (when query is needed and when query is not needed). Note that the principle of the data control apparatus 30 and the principle of the data control apparatus 40 are the same as each other, and thus the principle of the data control apparatus 30 will be explained below.

As shown in FIG. 8, at time T0, CPU_DATA_IMMEDIATE=0, which indicates that the data cannot immediately be output. Further, WP=A indicates that the write address of the RAM is A.

Thereafter, at time T1, MSQRSV_IDX=A and FLAG<A>=0, which indicate that there is data requiring a query. Subsequently, at time T2, ASK<A>=A, which indicates that the query about address A has been made. Thereafter, at T3 and T4, a result of the query is waited.

When output permission of the address A of the RAM is obtained at time T5, namely, MSQACK_IDX=A, FLAG<A>=1 is set at time T6, and the data written into the address A of the RAM is in the output enabled state. Subsequently, RPX=A, namely, the address of the oldest CPU_DATA, among the CPU_DATA with REQVLD=1 and FLAG=1 which enable to be output, becomes A.

Thereafter, at time T7, RP=A+1, and because the address of the oldest CPU_DATA among the data stored in the RAM is A, the data of the address A of the CPU_DATA is output from the MOMBQ.

[Time Chart (When Query is Needed and When Query is Not Needed)]

As shown in FIG. 9, at time T0, CPU_DATA_IMMEDIATE=0, which indicates that the data cannot immediately be output. Further, WP=A indicates that the write address of the RAM is A, and at time T1, MSQRSV_IDX=A and FLAG<A>=0, which indicate that it is necessary to query an output destination about the address A of the RAM, and the query is started at time T2.

Thereafter, at time T5, output permission for the address A of the RAM is obtained, namely, MSQACK_IDX=A. At time T6, FLAG<A>=1, and the data written into the address A of the RAM is in the output enabled state.

Meanwhile, at time T3, CPU_DATA_IMMEDIATE=1, which indicates that there is data which can be immediately output. Subsequently, the data is stored in address A+1 of the RAM, and the data can be immediately output, and thus, FLAG<A+1>=1 at time T4.

Here, FLAG<A+1>=1 is obtained at time T4 and FLAG<A>=1 is obtained at time T6, and thus, RPX=A+1, namely, the address of the oldest data of the data with FLAG=1 among the CPU_DATA becomes A+1 at time T4 and becomes A at time T6. Consequently, the data of the address A+1 is output at time T5, and thereafter, the data of the address A is output at time T7.

[Effect by First Embodiment]

As explained above, according to the first embodiment, both the data output from the central processing unit to the main storage unit and the data output from the central processing unit to other central processing unit are stored, and when the stored data is in the output enabled state, the information indicating the output enabled state is added to the data, and the data with the information added thereto are output in the order of the oldest stored data. Thus, for example, the data input from the central processing unit (CPU) are stored in one storage unit (memory) regardless of output destinations of the data, and when the stored data is in the output enabled state, then the data can be output to each of the output destinations in the order in which the data is stored. As a result, the data control can be performed by one memory without any need to provide a plurality of high-cost storage units (memories) having the speed equal to that of the central processing unit for each output destination to improve the system performance, which allows cost reduction of the system construction.

The embodiment of the present invention is explained so far, however, the present invention may be executed in variously different embodiments other than the embodiment. Therefore, other embodiment as a second embodiment included in the present invention will be explained below.

For example, the case where the components are formed into the clusters is explained in the first embodiment, however, the present invention is not limited thereby, and thus, the present invention may be applied to a case where data is output to other computer system which has different functions.

Of the processes (see FIG. 3) performed by the data control apparatus explained in the present embodiment, all or part of the processes explained as being automatically performed may be manually performed, or all or part of the processes explained as being manually performed may be automatically performed using any known method. In addition, the processing procedures, the control procedures, the specific names, and the information (e.g., FLAG and CPU_DATA) including various types of data and parameters, which are shown in the document and the drawings, can be arbitrarily changed unless otherwise specified.

Figure 2:
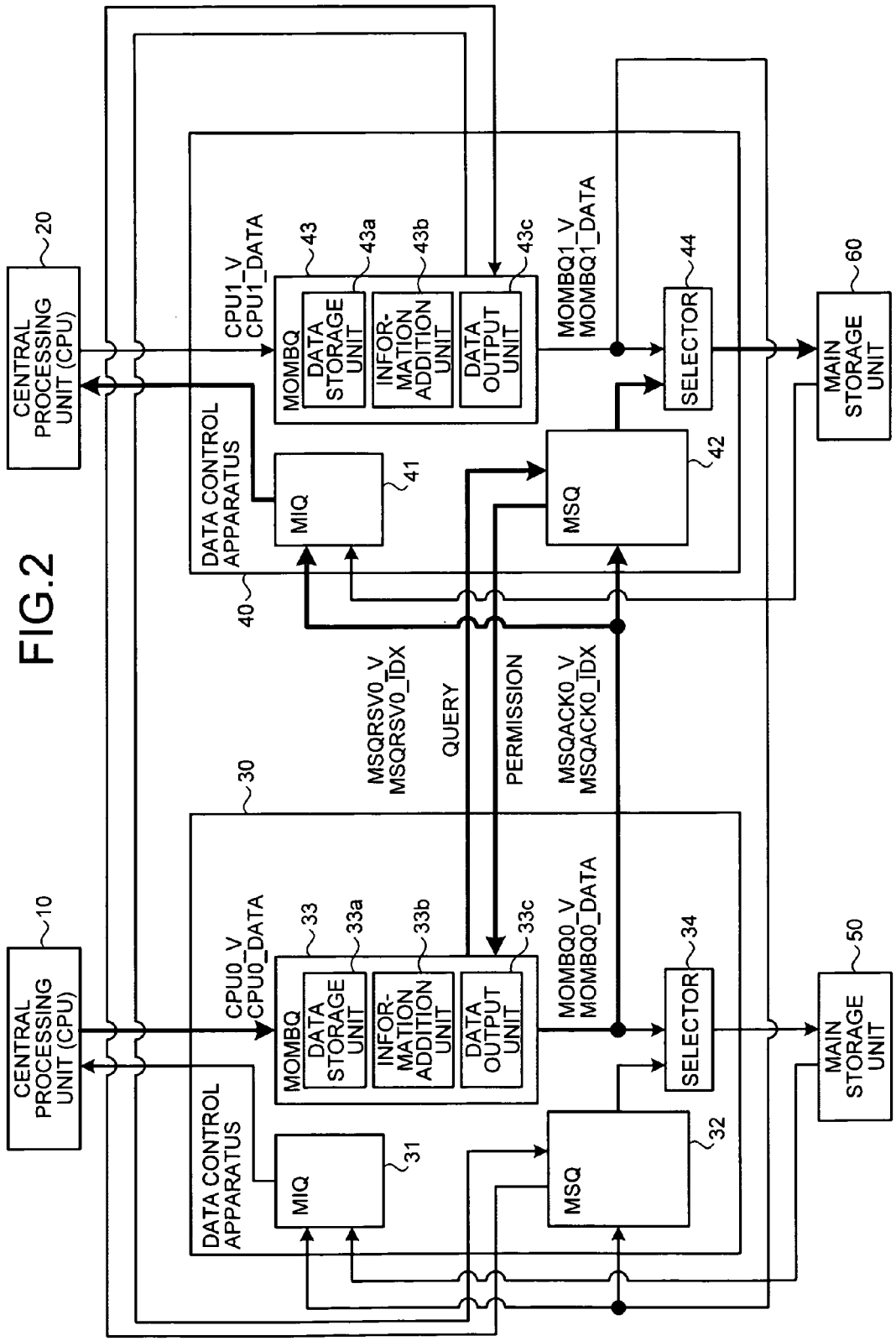
FIG. 2 is a block diagram showing an overall configuration of a system including the data control apparatus according to the first embodiment.

The components of the data control apparatuses shown in FIG. 2 and the explanation of the principle of the data control apparatuses shown in FIGS. 3 to 7 are functionally conceptual, and thus they are not necessarily physically configured as shown in the figures. In other words, the specific mode of distribution or integration of units, for example, distribution or integration of the information addition unit 33b and the data output unit 33c, is not limited to the shown ones. Thus, all or a part thereof can be functionally or physically distributed or integrated by each arbitrary unit according to the various types of load or the status of use or the like. Moreover, all or arbitrary part of the processing functions performed by the data control apparatuses can be implemented by the CPU and programs which are analyzed and executed by the CPU, or can be implemented as hardware using wired logic.

The various processes explained in the embodiments can be realized by executing pre-prepared programs by a computer system such as a personal computer and a work station. Hereinafter, an example of a computer system that executes a program having the functions the same as these in the first embodiment will therefore be explained.

[Computer System that Executes Data Control Program]

Figure 10:
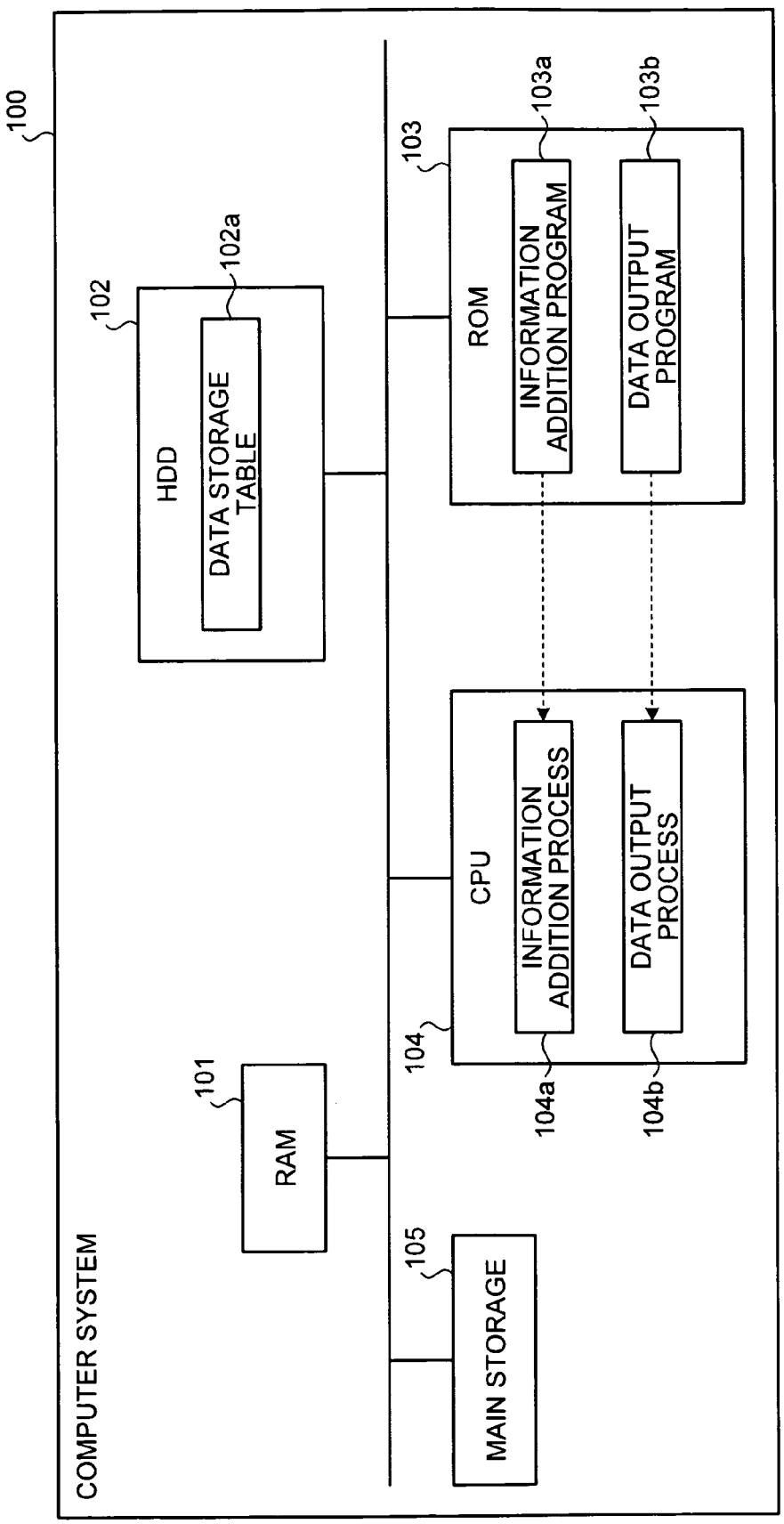
FIG. 10 is a diagram showing an example of a computer system that executes a data control program.

FIG. 10 is a diagram showing a computer system 100 that executes a data control program. As shown in this figure, the computer system 100 includes a RAM 101, a HDD 102, a ROM 103, a CPU 104, and a main storage 105. Previously stored in the ROM 103 are programs i.e. an information addition program 103a and a data output program 103b, as shown in FIG. 10, that function in the same manner as the embodiments.

The CPU 104 reads and executes these programs 103a and 103b, to obtain an information addition process 104a and a data output process 104b as shown in FIG. 10. It is noted that the processes 104a and 104b correspond to the information addition unit 33b and the data output unit 33c respectively as shown in FIG. 2.

Provided in the HDD 102 is a data storage table 102a that temporarily stores therein data transmitted from the CPU 104 to the main storage 105 or to a CPU of other device. The CPU 104 calls information stored in the data storage table 102a on the RAM 101 and executes various processes to the information. Note that the data storage table 102a corresponds to the data storage unit 33a as shown in FIG. 2.

The programs 103a and 103b are not necessarily stored in the ROM 103. For example, the programs 103a and 103b may be stored in a "portable physical medium" such as a flexible disk (FD), a CD-ROM, an MO disc, a DVD disk, an magneto-optical disc, and an IC card, each of which is inserted in the computer system 100, in addition to this, in a "fixed physical medium" such as a hard disk drive (HDD) internally or externally provided in the computer system 100, and further in an "other computer system" connected to the computer system 100 via a public line, the Internet, LAN, WAN, or the like, and the computer system 100 may read the programs from any one of these media and execute them.

According to the embodiment, both the data output from the central processing unit to the main storage unit and the data output from the central processing unit to other central processing unit are stored. When the stored data is in an output enabled state, information indicating the output enabled state is added to the data, and the data with the information added thereto are output from the oldest stored data in order of storage. Thus, for example, the data input from the central processing unit (CPU) are stored in one data storage unit (memory) regardless of their output destinations, and when the stored data is in the output enabled state, the data can be output to each of the output destinations in the order in which the data is stored. As a result, the data control can be performed by one memory without any need to provide a plurality of high-cost storage units (memories) or the like having a speed equal to that of the central processing unit for each output destination to improve system performance, which allows cost reduction of the system construction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data control apparatus that is connected to a central processing unit that processes data and to a main storage unit that stores therein the data, and controls output of the data, comprising:
    a data storage unit that stores therein first data output from the central processing unit to the main storage unit and second data output from the central processing unit to other central processing unit;
    an information addition unit that adds first information indicating an output enabled state to the first data stored in the data storage unit, adds second information indicating an output disabled state to the second data stored in the data storage unit, and adds the first information to the second data when the second data is in output enabled state after the adding of the second information; and
    a data output unit that outputs the data with the information added thereto by the information addition unit from oldest stored data in order of storage in the data storage unit.

2. A data control method of controlling output of data between a central processing unit that processes data and a main storage unit that stores therein the data, comprising:
    storing first data output from the central processing unit to the main storage unit and second data output from the central processing unit to other central processing unit;
    adding first information indicating an output enabled state to the first data stored in the storing, adding second information indicating an output disabled state to the second data stored in the storing, and adding the first information to the second data when the second data is in output enabled state after the adding of the second information; and
    outputting the data with the information added thereto in the adding from oldest stored data in order of storage in the storing.

3. A computer-readable recording medium that stores therein a computer program for controlling output of data between a central processing unit that processes data and a main storage unit that stores therein the data, the computer program causing a computer to execute:
    storing first data output from the central processing unit to the main storage unit and second data output from the central processing unit to other central processing unit;

adding first information indicating an output enabled state to the first data stored in the storing, adding second information indicating an output disabled state to the second data stored in the storing, and adding the first information to the second data when the second data is in output enabled state after the adding of the second information; and outputting the data with the information added thereto in the adding from oldest stored data in order of storage in the storing.

* * * * *